(12) United States Patent
Wang et al.

(10) Patent No.: US 11,354,153 B2
(45) Date of Patent: Jun. 7, 2022

(54) LOAD BALANCING THROUGH AUTONOMOUS ORGANIZATION MIGRATION

(71) Applicant: Salesforce.com, Inc., San Francisco, CA (US)

(72) Inventors: Xiaodan Wang, Dublin, CA (US); Ilya Zaslavsky, San Francisco, CA (US); Prakash Ramaswamy, San Francisco, CA (US); Sridevi Gopala Krishnan, San Francisco, CA (US); Mikhail Chainani, San Francisco, CA (US); Scott Ware, San Francisco, CA (US); Lauren Valdivia, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 197 days.

(21) Appl. No.: 16/749,373

(22) Filed: Jan. 22, 2020

(65) Prior Publication Data

US 2021/0224106 A1     Jul. 22, 2021

(51) Int. Cl.
| | | |
|---|---|---|
| *G06F 9/38* | (2018.01) | |
| *G06F 9/48* | (2006.01) | |
| *G06F 9/50* | (2006.01) | |
| *G06F 9/54* | (2006.01) | |

(52) U.S. Cl.
CPC .......... *G06F 9/4856* (2013.01); *G06F 9/3891* (2013.01); *G06F 9/505* (2013.01); *G06F 9/5072* (2013.01); *G06F 9/541* (2013.01); *G06F 9/546* (2013.01)

(58) Field of Classification Search
CPC ...... G06F 9/505; G06F 9/5072; G06F 9/3891; G06F 9/4856; G06F 9/541; G06F 9/546
See application file for complete search history.

(56) References Cited

U.S. PATENT DOCUMENTS

| | | | |
|---|---|---|---|
| 9,268,605 | B2 | 2/2016 | Wang et al. |
| 9,348,648 | B2 | 5/2016 | Wang et al. |
| 9,529,626 | B2 | 12/2016 | Wang et al. |
| 9,632,852 | B2 | 4/2017 | Kwong et al. |
| 9,766,960 | B2 | 9/2017 | Wang |
| 9,813,516 | B2 | 11/2017 | Wang |
| 10,013,294 | B2 | 7/2018 | Kwong et al. |
| 10,140,153 | B2 | 11/2018 | Wang |
| 10,169,090 | B2 | 1/2019 | Wang |
| 2014/0075017 | A1 | 3/2014 | Wang et al. |
| 2015/0046279 | A1 | 2/2015 | Wang |

(Continued)

FOREIGN PATENT DOCUMENTS

CA      2883883 C      9/2019

*Primary Examiner* — Emerson C Puente
*Assistant Examiner* — Jonathan R Labud
(74) *Attorney, Agent, or Firm* — Kwan & Olynick LLP

(57) ABSTRACT

A resource utilization level and a data size may be determined for each organization within a computing pod located within an on-demand computing services organization configured to provide computing services. One of the organizations may be selected for migration away from the computing pod based on the resource utilization levels and the data sizes. The designated organization may have a respective resource utilization level that is high in relation to its respective data size.

20 Claims, 12 Drawing Sheets

(56) References Cited

U.S. PATENT DOCUMENTS

| | | | |
|---|---|---|---|
| 2016/0077846 A1* | 3/2016 | Phillips | G06Q 10/06 |
| | | | 718/1 |
| 2016/0119244 A1 | 4/2016 | Wang et al. | |
| 2016/0119246 A1 | 4/2016 | Wang | |
| 2017/0236188 A1* | 8/2017 | Puck | G06Q 30/0635 |
| | | | 705/26.81 |
| 2018/0063271 A1 | 3/2018 | Wang | |
| 2018/0329793 A1 | 11/2018 | Obembe et al. | |
| 2018/0331887 A1 | 11/2018 | Obembe et al. | |
| 2019/0057133 A1 | 2/2019 | Chainani et al. | |
| 2019/0065542 A1 | 2/2019 | Baker et al. | |
| 2019/0095249 A1 | 3/2019 | Wang | |
| 2019/0235895 A1 | 8/2019 | Ovesea et al. | |
| 2019/0235918 A1 | 8/2019 | Liu et al. | |
| 2019/0236150 A1 | 8/2019 | Zaslavsky et al. | |
| 2019/0236201 A1 | 8/2019 | Wang et al. | |
| 2019/0306008 A1 | 10/2019 | Chainani et al. | |
| 2019/0363928 A1 | 11/2019 | Obembe et al. | |

\* cited by examiner

LOAD BALANCING THROUGH AUTONOMOUS ORGANIZATION MIGRATION

FIELD OF TECHNOLOGY

This patent document relates generally to distributed database systems, and more specifically to distributed database systems within on-demand computing services environments.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

To facilitate resource management, hardware and software resources used to provide cloud computing services may be organized into computing architecture units referred to herein as "computing pods." Each computing pod may be configured to provide computing services to one or more organizations that effectively reside on the pod. Over time, however, organizations may increase or decrease their usage of computing resources, leading pods to become unbalanced. For instance, one pod may exhibit excessive database CPU usage during peak hours, while another pod may exhibit excessive database input/output ("I/O") during peak hours.

BRIEF DESCRIPTION OF THE DRAWINGS

The included drawings are for illustrative purposes and serve only to provide examples of possible structures and operations for the disclosed inventive systems, apparatus, methods and computer program products for migrating one or more organizations within an on-demand computing services environment. These drawings in no way limit any changes in form and detail that may be made by one skilled in the art without departing from the spirit and scope of the disclosed implementations.

DETAILED DESCRIPTION

Figure 1:
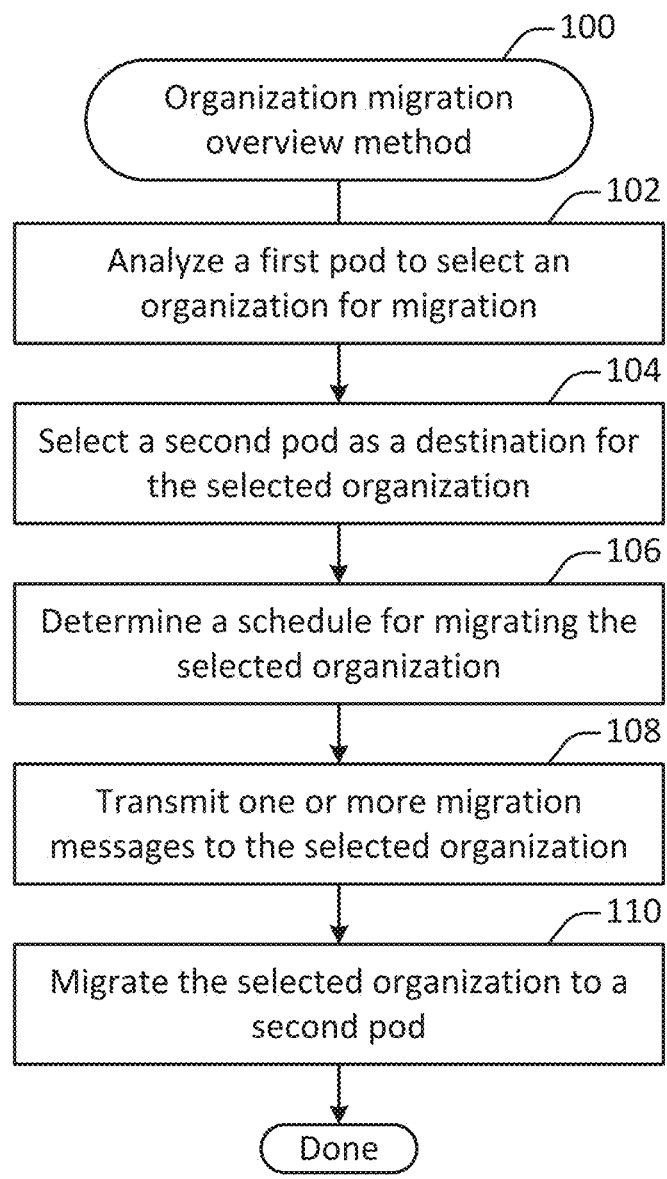
FIG. 1 illustrates an example of an overview method for organization migration, performed in accordance with one or more embodiments.

According to various embodiments, techniques and mechanisms described herein facilitate the transfer of organizations between units of computing architecture, referred to herein as computing pods. A cloud computing system may include a number of computing pods that each may include a combination of computing hardware and software and may be configured to provide computing services to one or more organizations associated with the pod. In many configurations, such as public cloud computing architectures, a cloud computing system may have a large and rapidly growing number of computing pods, which collectively may provide services to organizations that range from the very small to the very large in terms of their computing usage. Moreover, these organizations may vary widely in the nature and type of computing resource utilization. For instance, some organizations may be associated with a large amount of stored data, while other organizations may be associated with a large amount of CPU-intensive calculation.

Using conventional approaches, a large number of computing pods with a large number of organizations distributed across those pods stresses the system's ability to manage capacity and distribute computing load. For example, migrating organizations between pods is typically a time-consuming and manual approach, in which an organization is first manually selected for migration, followed by the manual selection of the destination pod, and then by the manual scheduling and execution of the transfer itself. This transfer can involve suspending access for the migrating organization, and then transferring potentially many different types of data, such as relational database data, flat files, backups, and more.

In contrast to conventional techniques, techniques and mechanisms described herein provide for continuous, fully automated, and small-scale migration events. For example, the system may balance the utilization of resources across an entire computing system by continuously and automatically migrating customer workloads between computing pods. Such migrations may be implemented as incremental, small-scale events that do not overly tax the system. The cumulative impact of these migrations can lead to significantly improved customer experience and significantly reduced cost-to-service, thus improving the operation and capabilities of the computing system itself.

According to various embodiments, techniques and mechanisms described herein may provide for balanced utilization across computing pods along a set of resource dimensions that approximate overall computing pod usage. Such balance may be achieved even when the computing system includes heterogenous hardware and/or software across pods. Organization migrations may be scheduled in a manner that accounts for both migration load and resource utilization. Customer service may be improved by providing for automated communication, self-service scheduling input, and/or other such interaction tools. Cost-to-serve may be reduced by allowing computing pods to operate at higher utilization thresholds. The system may respond to failure of one or more components by automatically restoring migration system state, providing resilience against a variety of failure scenarios.

Consider the example of Alexandra, a systems administrator for Acme organization that accesses computing services through an on-demand computing services environment. In a system configured with conventional techniques, Acme may be located on a pod that over time develops unbalanced resource utilization. During peak hours, resource constraints may slow or disrupt service to Acme, a heavy user of database I/O capacity, and create challenges for Alexandra in terms of configuring and facilitating usage of the cloud computing environment.

In contrast, using techniques and mechanisms described herein, the on-demand computing services environment may automatically determine that, for instance, database I/O capacity or Acme's pod is consistently oversubscribed during peak hours. The service may then automatically identify an alternate computing pod with spare capacity for Acme, and communicate with Alexandra to inform her of a scheduled time for transferring her organization. Alexandra may approve, monitor, and reschedule the migration as necessary, but otherwise may see substantial performance improvement with little or no manual intervention.

FIG. 1 illustrates an example of an overview method 100 for organization migration, performed in accordance with one or more embodiments. According to various embodiments, the method 100 may be performed at one or more computing components within a computing services environment, which is also referred to herein as a cloud computing system.

A first pod is analyzed at 102 to select an organization for migration. In some implementations, the organization may be selected by first analyzing the computing resource utilization of organizations within the pod. Then, other characteristics may be taken into consideration, such as whether and when the organizations in the pod have been migrated in the past, as well as the projected effect that a migration would have on the future resource utilization of the pod. Additional details regarding migration organization selection are described throughout the application, such as with respect to the method 500 shown in FIG. 5.

A second pod is selected at 104 as a destination for the selected organization. In some embodiments, the second pod may be selected based on a variety of considerations, such as the projected effect that a migration would have on the future resource utilization of the pod. For instance, if the selected organization is associated with disproportionately heavy usage of database CPU, then a destination pod may be selected that has historically exhibited light database CPU usage relative to the other computing resources available at the pod in an effort to create a balanced resource utilization profile. Additional details regarding migration organization selection are described throughout the application, such as with respect to the method 600 shown in FIG. 6.

A schedule for migrating the selected organization is determined at 106. According to various embodiments, the schedule for migrating the selected organization may be determined based on information such as organization migration preferences, time of day, and the scheduling of other migration events. Additional details regarding migration organization scheduling are described throughout the application, such as with respect to the method 700 shown in FIG. 7.

One or more migration messages is transmitted to the selected organization at 108. In some implementations, a migration message may be used to facilitate communication to the organization about the nature of the migration, and/or to receive input such as approval or rescheduling requests from the organization. Additional details regarding migration communication are described throughout the application, such as with respect to the method 800 shown in FIG. 8.

The selected organization is migrated to the second pod at 110. According to various embodiments, migrating the selected organization may involve disabling access to the selected organization at the first pod, transferring data associated with the organization to the second pod, and then activating the organization at the second pod. Additional details regarding organization migration are described throughout the application, such as with respect to the method 900 shown in FIG. 9.

Figure 2:
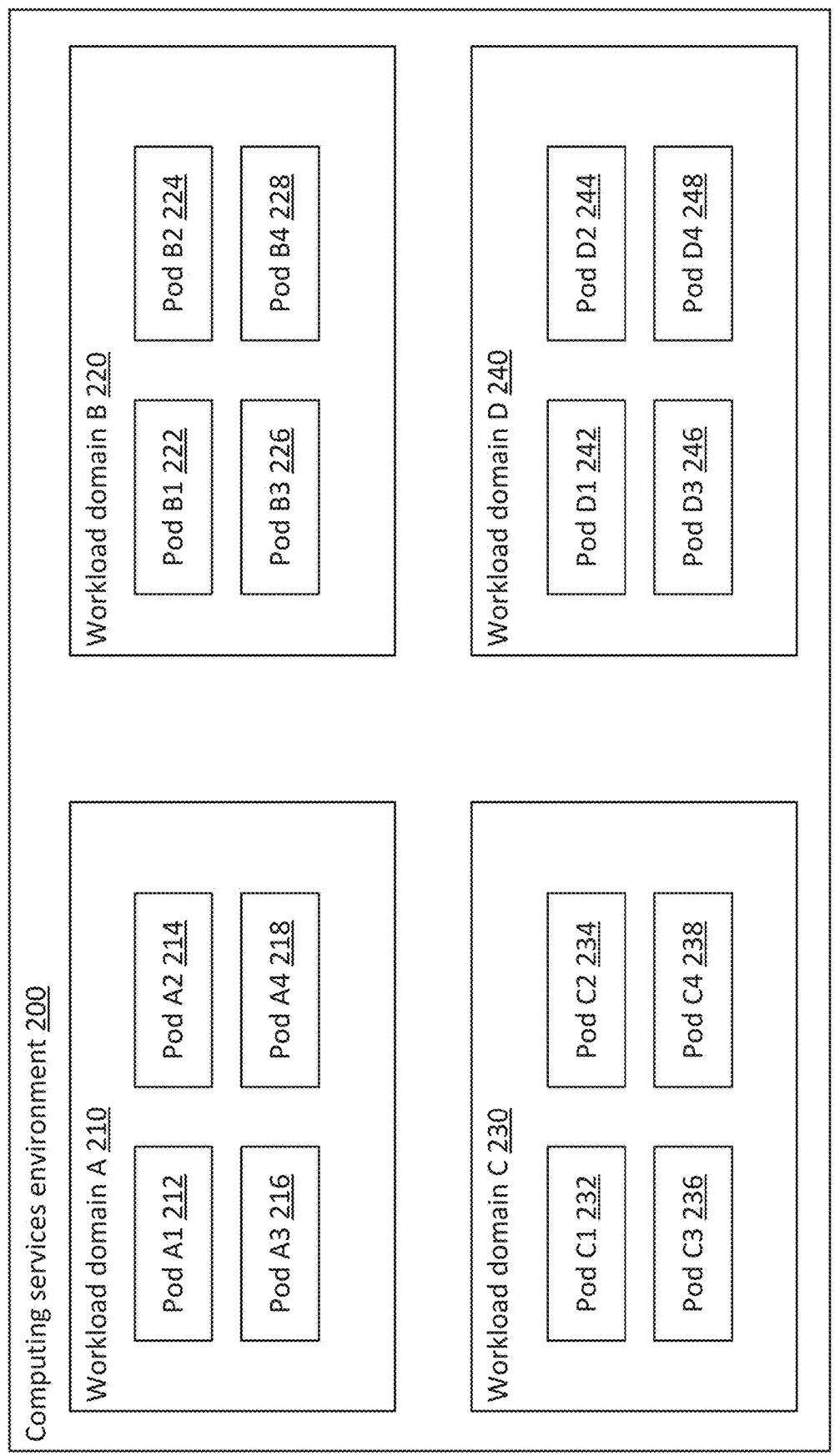
FIG. 2 illustrates an example of an arrangement of components in a computing services environment, configured in accordance with one or more embodiments.

FIG. 2 illustrates an example of an arrangement of components in a computing services environment 200, configured in accordance with one or more embodiments. The computing services environment 200 includes the workload domains 210, 220, 230, and 240, which include, respectively, the computing pods A1 212, A2 214, A3 216, and A4 218, the computing pods B1 222, B2 224, B3 226, and B4 228, the computing pods C1 232, C2 234, C3 236, and C4 238, and the computing pods D1 242, D2 244, D3 246, and D4 248.

According to various embodiments, each computing pod may be configured to provide on-demand computing services to one or more clients who are considered to reside in the computing pod. For example, a client that resides in a computing pod may own data that is stored in the computing pod. As another example, the computing pod may perform calculations, provide API endpoints, and/or manage communications with clients that reside in the computing pod.

In some implementations, each computing pod may include computing hardware and software for performing such operations. For example, a computing pod may provide for data storage, which may include one or more database systems, file storage repositories, or other such storage systems. As another example, a computing pod may provide for computation via one or more servers. As yet another example, a computing pod may facilitate communications with client machines via one or more network components. Example of the types of components that may be included in a computing pod is provided are discussed with respect to the computing pod 1144 in FIG. 11.

In some embodiments, one or more hardware components within a computing pod may be located within a computing environment service provider system, such as Amazon AWS, Google Compute, or Microsoft Azure. In such a configuration, the computing pod may be operated by the computing environment service provider. Alternately, the computing pod may be operated by a different service provider, such as Salesforce.com, that uses the computing environment service provider system to provide computing services to third party clients such as companies.

In some embodiments, computing pods may be organized into workload domains, as shown in FIG. 2. Each workload domain may correspond to any physical and/or logical grouping of computing pods. For example, a workload domain may be specific to a computing environment service provider system, such as Amazon AWS, Google Compute, or Microsoft Azure. As another example, a workload domain may be specific to a geographic area, such as the United States, Europe, California, a geographic area specified using geolocation coordinates, or some other unit of geography.

The computing services environment 200 shown in FIG. 2 is simplified for the purpose of illustration in the sense that it includes only four workload domains, which each include only four computing pods. While such a configuration may be employed, in practice a computing services environment may include any suitable number of workload domains, which may include any suitable number of computing pods. For instance, a computing services environment may include hundreds or thousands of workload domains, which may include varying numbers (e.g., thousands) of individual computing pods.

The computing services environment 200 shown in FIG. 2 is simplified for the purpose of illustration in the sense that the four workload domains are distinct and do not overlap. While such a configuration may be employed, in practice a computing services environment may include overlapping workload domains, such as one workload domain that corresponds to a geographic area and that overlaps with another workload domain that corresponds to a computing environment service provider system. Alternatively, or additionally, a single workload domain may have multiple characteristics, such as being specific to both a computing environment service provider system and a geographic area.

Figure 3:
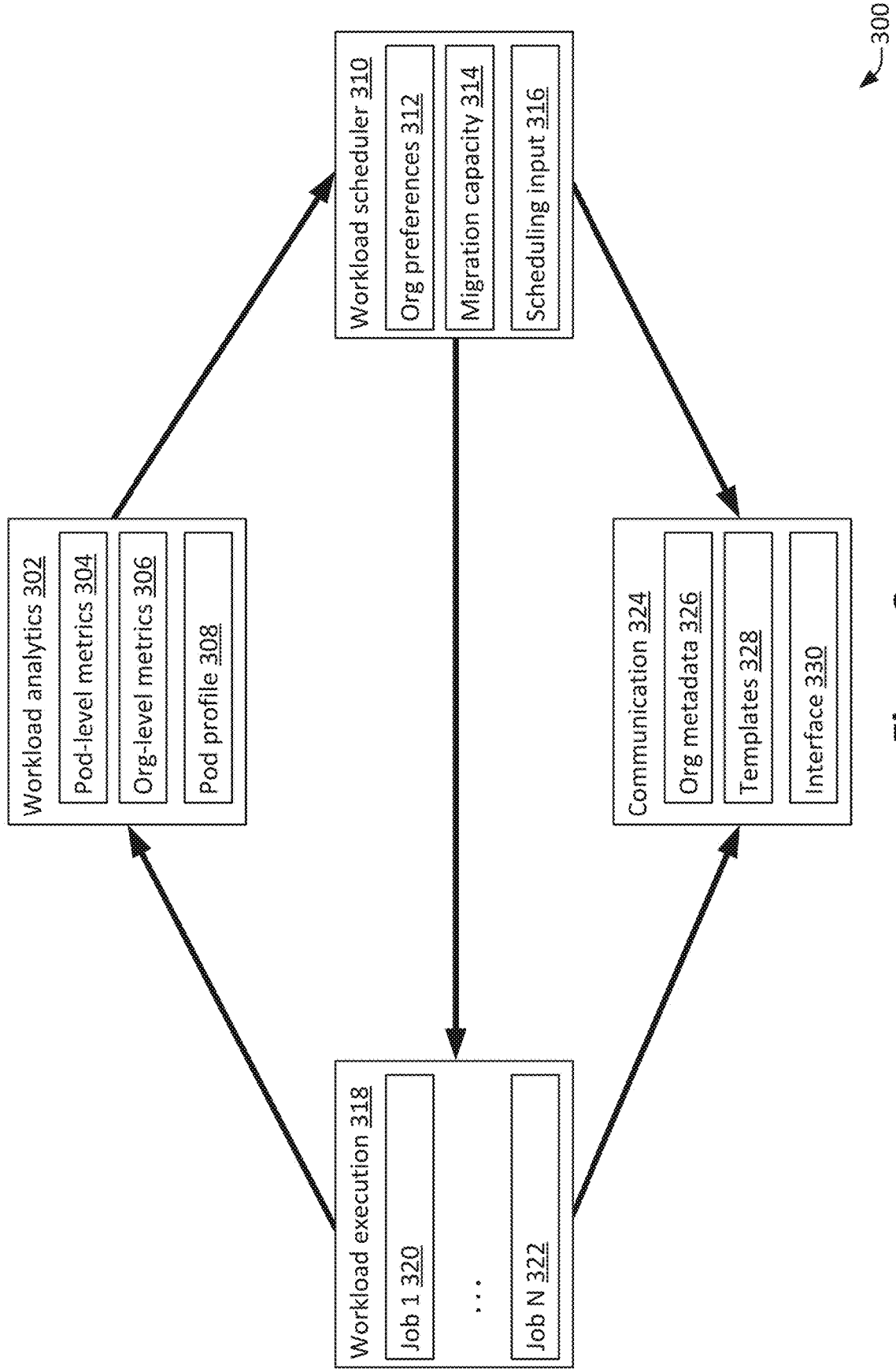
FIG. 3 illustrates an example of an arrangement of components in a migration system, configured in accordance with one or more embodiments.

FIG. 3 illustrates an example of an arrangement of components in a migration system 300, configured in accordance with one or more embodiments. One or more of the components shown in FIG. 3 may be implemented on suitable computing hardware and/or software, such as on one or more of the components shown in FIGS. 9, 10, and 11. The migration system 300 includes a workload analytics module 302, a workload scheduler module 310, a workload execution module 318, and a communication module 324.

In some implementations, the workload analytics module 302 analyzes data to recommend load balancing decisions. For instance, the workload analytics module 302 may analyze pod-level metrics 304, organization-level metrics 306, and/or pod profile information 308. The pod-level and organization-level metrics may include any suitable information about the usage of computing resources by one or more organizations on one or more pods. Such information may include, but is not limited to, information about CPU utilization, memory utilization, disk space utilization, API requests, database utilization, I/O bandwidth utilization, and communication utilization. In complex computing services environments, tens, hundreds, thousands, or more metrics may be analyzed.

According to various embodiments, the pod profile information 308 may identify information about the capabilities or functioning of one or more pods, such as the configuration of computing hardware and/or software included in or accessible via each pod. Alternately, or additionally, the pod profile information 308 may include information about organizations located on a pod.

In some embodiments, the workload scheduler module 310 may be implemented as a service responsible for coordinating and monitoring migration events. For instance, the workload scheduler module 310 may be implemented as a software asset management service. The workload scheduler module 310 may process recommendations from the workload analytics module 302 in view or organization preferences information 312, system and/or computing pod migration capacity information 314, scheduling input information 316, system maintenance events, and/or other relevant information to schedule migration events.

In some embodiments, scheduling input information 316 may be determined at least in part based on user input. For instance, an administrator associated with an organization may access a self-service scheduling portal to request a change to a scheduled migration event.

In some implementations, the workload execution module 318 may perform operations such as automating data movement and tracking the progress of scheduled migrations. For instance, the workload execution module 318 may leverage data migration capabilities associated with the computing service environment to execute migration jobs such as the jobs 320 through 322.

According to various embodiments, the communication module 324 may receive information from the workload scheduler module 310 and the workload execution module 318 to communicate with, for example, organizations scheduled for migration. For instance, the communications module 324 may apply organization metadata 326 to one or more templates 328 to send automated messages to organizations via the interface 330. Such messages may be sent via email or another communications protocol, and may inform the organization about events such as the scheduling and/or completion of a migration event associated with the organization's computing services.

Figure 4:
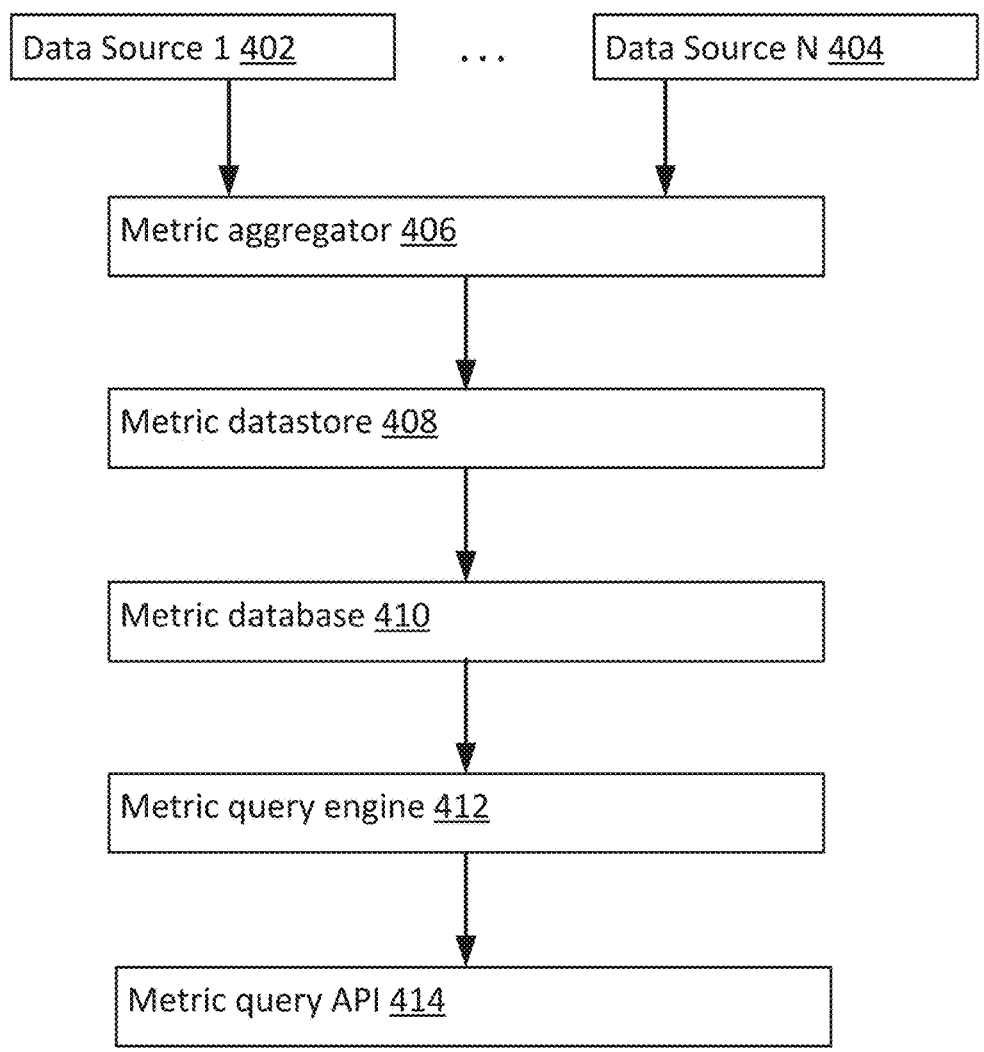
FIG. 4 illustrates an example of a data pipeline, configured in accordance with one or more embodiments.

FIG. 4 illustrates an example of a data pipeline 400, configured in accordance with one or more embodiments. According to various embodiments, the data pipeline 400 may be configured to support the collection, aggregation, storage, and querying of metric information for use in determining organization migration recommendations.

The data pipeline 400 may include one or more data sources such as the data sources 1 402 through N 404 from which raw metric data may be collected. In some implementations, such sources may include, but are not limited to, system logs, databases, files, and other such repositories.

Data from metric sources is aggregated by a metric aggregator 406. According to various embodiments, the metric aggregator 406 may function as an extract, transform, load pipeline that receives the data from the data sources and then stores the data in a metric datastore 408. The metric datastore 408 may include, for instance, one or more repositories of log files or other such information.

A metric database 410 may receive information from the data store and store the metric data in an organized, queryable fashion. Queries of the database may be managed by a metric query engine 412, which may facilitate the use of search tools such as elastic search. An API 414 may be used to transmit queries to and receive responses from the metric query engine 412.

Figure 5:
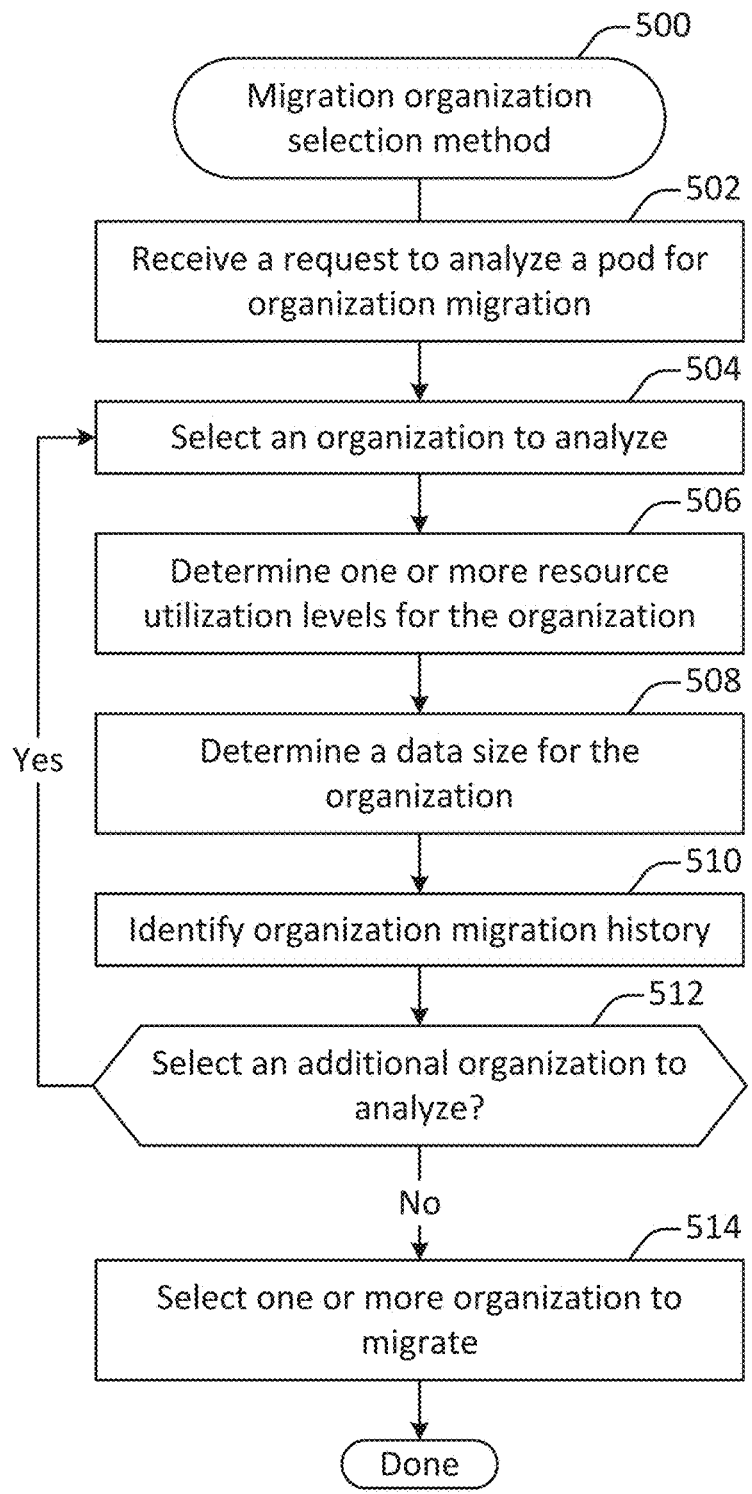
FIG. 5 illustrates an example of a method for selecting an organization for migration, performed in accordance with one or more embodiments.

FIG. 5 illustrates an example of a method 500 for selecting an organization for migration, performed in accordance with one or more embodiments. According to various embodiments, the method 500 may be performed at one or more components within an organization migration system, such as the workload analytics module 302 shown in FIG. 3.

A request to analyze a pod for organization migration is received at 502. In some implementations, the request may be received when it is determined that the pod has exceed a designated threshold associated with resource utilization. The designated threshold may be implemented on a metric-specific level, or may reflect aggregated usage across more than one metric. Alternatively, or additionally, pods may be periodically analyzed for organization migration regardless of resource utilization. For example, each pod may be analyzed on a daily, weekly, or monthly basis. As another example, all pods in a workload domain may be analyzed if there is significant skew between pods in terms of resource utilization across one or more metrics.

An organization is selected for analysis at 504. In some implementations, each organization residing within the pod may be analyzed. Organizations may be selected for analysis in sequence, at random, or in any suitable order. Alternately, or additionally, organizations may be selected for analysis based on historic resource utilization.

In particular embodiments, an organization migration blacklist may be maintained. The organization migration blacklist may identify organizations that have been flagged as not being candidates for migration. Such organizations may include, but are not limited to: particularly large organizations, organizations that pay for increased service levels, and organizations subject to severe geographic restrictions.

One or more resource utilization levels for the organization are determined at 506. According to various embodiments, resource utilization may be determined by querying a metric database, for instance via a metric query API and query engine as discussed with respect to FIG. 4.

According to various embodiments, various types of metrics may be analyzed. The particular types of metrics analyzed may depend on characteristics of the computing services environment. Examples of metrics that may be analyzed may include, but are not limited to: computational CPU usage, data input/output, memory usage, API calls, database CPU usage, database input/output, connection pooling, and asynchronous process capacity. As discussed with respect to FIG. 4, such metrics may be determined by, for instance, analyzing aggregate logs that describe organization-level and pod-level activities.

A data size for the organization is determined at 508. According to various embodiments, the data size may reflect any of various data types. For example, the data size may reflect data stored in a database, data stored in one or more flat files, data stored in a key value store, or any other relevant type of data storage usage.

Organization migration history is identified at 510. According to various embodiments, one or more constraints may be imposed on organization migration, for instance to avoid migrating the same organization too frequently. For example, a restriction may be imposed that the same organization may not be migrated more than once per year in the absence of exceptional circumstances.

A determination is made at 512 as to whether to select an additional organization to analyze. In some implementations, each organization in the pod may be analyzed, as discussed with respect to the operation 504. Alternately, organizations meeting some characteristic, such as high resource utilization, may be selected for analysis. Alternately, or additionally, organizations may be selected for analysis until a suitable number of candidate organizations have been identified for migration.

When it is determined to not select an additional organization to analyze, at 514 one or more organizations are selected for migration. According to various embodiments, an organization or organizations may be selected for migration based on any of a variety of characteristics. For example, migrating an organization with a larger data size may be more costly and risky, while migrating an organization having a higher utilization rate may provide greater benefit. Accordingly, the selection made at 514 may involve identifying one or more organizations having a high normalized resource utilization and a low normalized data usage relative to other organizations within the computing pod.

According to various embodiments, a migration risk value may be calculated for one or more organizations. The migration risk value may indicate a risk level associated with migrating an organization away from the computing pod. For example, the risk level may be higher for organizations associated with many different types of complex data, and lower for organizations associated with fewer types of simpler data.

In particular embodiments, a migration "tax" value may be calculated that represents the cost and/or risk associated with existing migrations scheduled from a computing pod. Then, one or more organizations may be selected for migration in such a way as to reduce the projected resource utilization for the computing pod while nevertheless keeping the migration tax value below a designated threshold.

Figure 6:
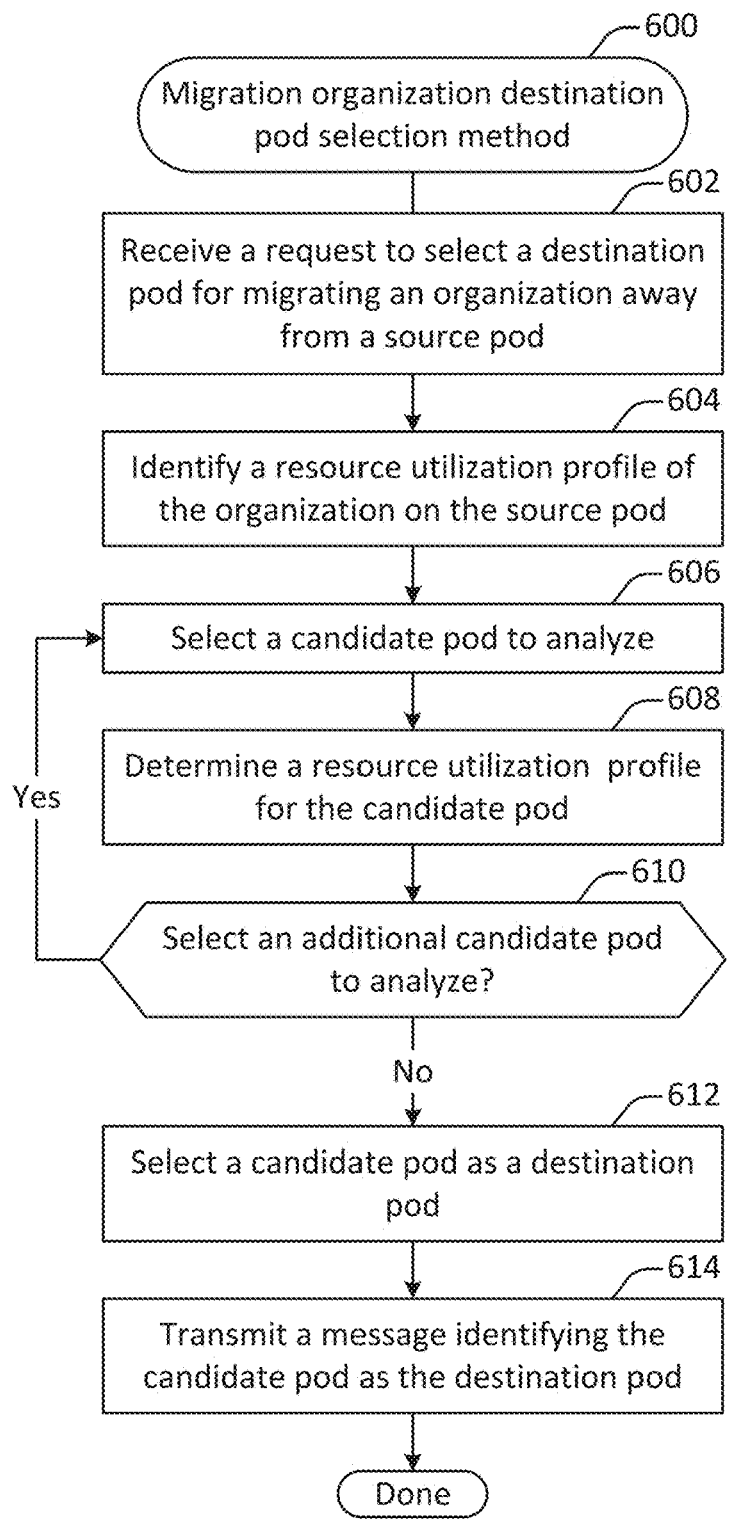
FIG. 6 illustrates an example of a method for selecting a destination pod for an org selected for migration, performed in accordance with one or more embodiments.

FIG. 6 illustrates an example of a method 600 for selecting a destination pod for an org selected for migration, performed in accordance with one or more embodiments. According to various embodiments, the method 600 may be implemented at a workload analytics module, such as the workload analytics module 302 shown in FIG. 3.

A request to select a destination pod for migrating an organization away from a source computing pod is received at 602. In some implementations, the request may be generated upon the selection of an organization to migrate away from a source computing pod, as discussed with respect to the method 500 shown in FIG. 5.

A resource utilization profile of the organization on the source pod is determined at 604. According to various embodiments, the resource utilization profile for the candidate computing pod may be determined based on one or more query results received from a query engine used to access one or more metrics from a metric database, as discussed with respect to FIG. 4. The resource utilization profile may identify, for instance, characteristics such as the historical maximum, mean, and standard deviation for a variety of metrics at the organization over time intervals within a period of time. Time intervals may be operationalized on the level of minutes, hours, days, or any suitable unit, while the historical time period analyzed may include, for example, the last month, the last several months, the last year, or any other suitable period.

A candidate computing pod is selected to analyze at 606. According to various embodiments, candidate computing pods may be selected for analysis in any of a variety of ways. For example, a database query may be sent to a query API such as the API 414 shown in FIG. 4. The database query may seek to identify one or more computing pods that meet one or more characteristics, such as resource utilization characteristics. As another example, computing pods may be selected for analysis in sequence, at random, or in any suitable order.

A resource utilization profile for the candidate computing pod is determined at 608. In a manner similar to that discussed with respect to the operation 604, in some implementations the resource utilization profile for the candidate computing pod may be determined based on one or more query results received from a query engine used to access one or more metrics from a metric database. The resource utilization profile may identify, for instance, characteristics such as the historical maximum, mean, and standard deviation for a variety of metrics at the candidate computing pod over time intervals within a period of time. Time intervals may be operationalized on the level of minutes, hours, days, or any suitable unit, while the historical time period analyzed may include, for example, the last month, the last several months, the last year, or any other suitable period.

In some embodiments, when determining a resource utilization profile for the candidate computing pod, the resource utilization may be determined based on the organizations that are located on the candidate computing pod, in addition to the resource utilization of any organizations scheduled to be migrated to the candidate computing pod in the future, less the resource utilization of any organizations scheduled to be migrated away from the candidate computing pod in the future. In this way, the resource utilization may reflect not only actual historical usage, but estimated historical usage based on scheduled future organization migration. Additionally, such an approach may allow for migrations to be scheduled further in the future, since each organization's resource usage may be attributed to the computing pod on which the organization will be located in the future, irrespective of when such future migrations are actually executed.

A determination is made at 610 as to whether to select an additional candidate computing pod to analyze. According to various embodiments, additional computing pods may continue to be selected until a suitable computing pod is identified. Alternately, each pod may be analyzed until the best destination computing pod along one or more criteria is identified.

A candidate computing pod is selected as a destination computing pod at 612. In some implementations, the candidate pod may be selected at least in part by identifying a computing pod having a resource utilization profile that complements the resource utilization profile of the migrating organization. For example, if the migrating organization exhibits historically high usage across some set of metrics A but historically low usage across another set of metrics B, then a destination computing pod may be selected that overall exhibits historically low usage across the set of metrics A but historically high usage across another set of metrics B.

In some embodiments, the candidate pod may be selected at least in part by identifying a computing pod having a resource utilization profile that, when joined with the resource utilization of the migrating organization, is projected to have resource utilization that falls below one or more designated thresholds. Such thresholds may be implemented in a metric-specific fashion, or may be specified in a way that aggregates across multiple metrics.

A message identifying the candidate computing pod as the destination computing pod is transmitted at 614. In some implementations, the message may be transmitted to a workload scheduler, such as the workload scheduler 310 shown in FIG. 3. Additional details regarding the scheduling of a migration are discussed with respect to the method 700 shown in FIG. 7.

Figure 7:
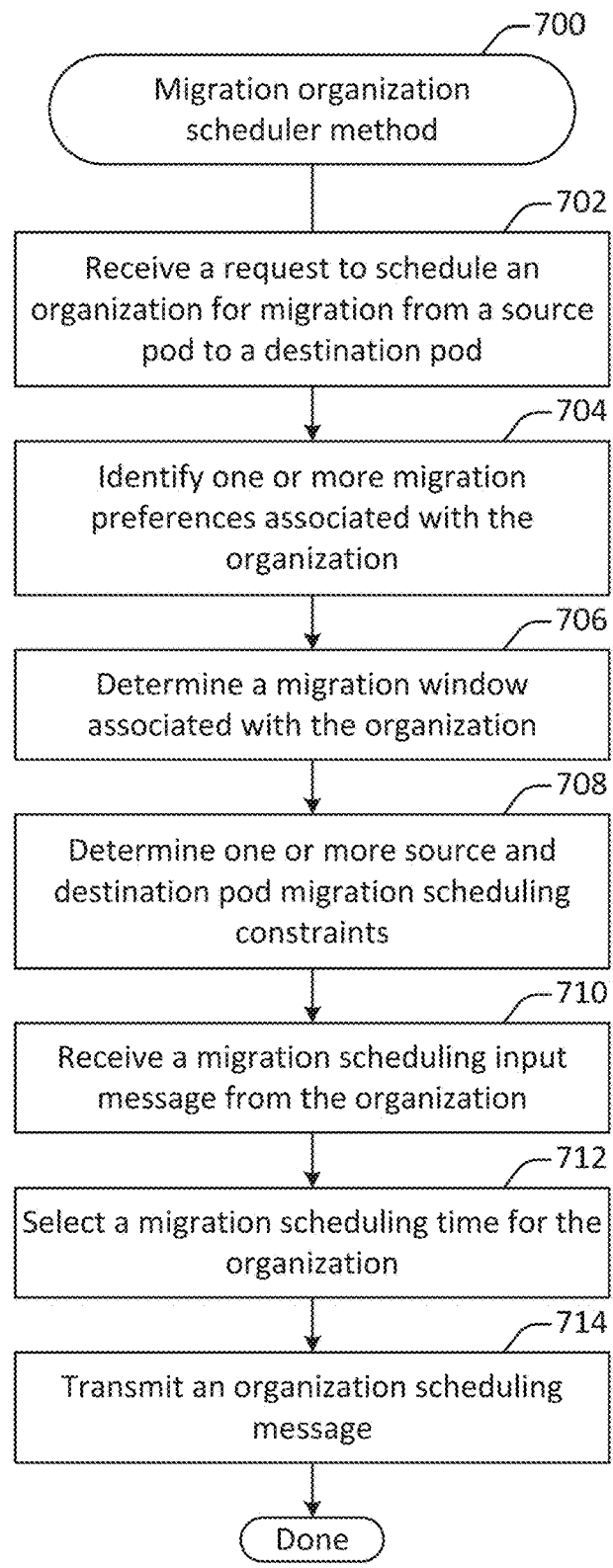
FIG. 7 illustrates an example of a method for scheduling an organization for migration, performed in accordance with one or more embodiments.

FIG. 7 illustrates an example of a method for scheduling an organization for migration, performed in accordance with one or more embodiments. According to various embodiments, the method 700 may be employed determine a time at which to execution the migration of the organization between the source computing pod and the destination computing pod. The method 700 may be implemented at a workload scheduler module, such as the workload scheduler module 310 shown in FIG. 3.

A request to schedule an organization for migration from a source pod to a destination pod is received at 702. In some implementations, the request may be received from a workload analytics module such as the module 302 shown in FIG. 3. For instance, the request may be generated upon the completion of a migration organization selection method and a migration organization destination pod selection method such as the methods 500 and 600 shown in FIGS. 5 and 6.

One or more migration preferences associated with the organization are identified at 704. In some implementations, organizations may specify one or more migration preferences, which may be maintained as settings within the computing services environment. For example, an organization may specify one or more preferences about day of the week, month of the year, time of day, or other such characteristics related to migration scheduling.

A migration window for the migration is determined at 706. According to various embodiments, a migration window may be a period of time during which the migration may be scheduled. The migration window may be specified as having a start point and an end point. In this way, the organization may be given flexibility in terms of the precise scheduling of the migration, while at the same time being constrained in terms of the maximum period for which the migration may be delayed. In some implementations, the start point and end point may be strategically determined based on factors such as one or more characteristics of the on-demand computing services, one or more characteristics of the source computing pod, one or more characteristics of the destination computing pod, and/or one or more characteristics of the organization being migrated.

According to various embodiments, by setting an earlier start point and an earlier end point, the organization may be migrated more quickly. Earlier start and/or end points may be set when, for instance, the need for migration is urgent. By setting a later start and/or end point, the organization may be given more time to prepare for and/or anticipate the migration. Later start and/or end points may be set when, for instance, the organization is associated with a large volume of data and/or traffic, and needs more time to prepare. By increasing the time between the start point and the end point, the organization may be provided with increased flexibility to reschedule the migration.

One or more source and destination computing pod migration scheduling constraints are determined at 708. In some embodiments, computing pod migration scheduling constraints may be any conditions that restrict the migrations that may be performed during a particular period of time without unduly compromising computing services. For example, a destination computing pod and/or a source computing pod may be associated with a maximum amount of data that may be migrated on or off the computing pod within a designated period of time.

A migration scheduling input message is received from the organization at 710. According to various embodiments, the organization may be notified of the migration as discussed with respect to the method 800 shown in FIG. 8. The migration scheduling input message may be received in order to receive input from the organization about migration scheduling. For example, a message sent to an administrator at the organization may specify the migration window determined at 706. The administrator at the organization may send a response to the message via email, web application, or some other mechanism to request a specific migration period within the migration window.

A scheduled migration time is selected for the organization at 712. In some embodiments, the scheduled migration time may be selected based on input received from the organization, for instance in response to the message sent at 710. Alternately, or additionally, the scheduled migration time may be strategically determined, for instance based on the migration preferences identified at 704, the migration window determined at 706, and/or the scheduling constraints determined at 708.

In some embodiments, the migration preferences identified at 704, the migration window determined at 706, and/or the scheduling constraints determined at 708 may be analyzed to identify a set of candidate migration times. These candidate migration times may then be sent to the organization, which may respond at 710 by requesting a particular one of the candidate migration times for organization migration.

An organization scheduling message is transmitted at 714. According to various embodiments, the organization scheduling message may be transmitted to one or more administrators associated with the organization scheduled for migration. The organization scheduling message may identify, for instance, the date and time on which the organization is scheduled for migration. Additional details regarding migration communication are described with respect to the method 800 shown in FIG. 8.

Figure 8:
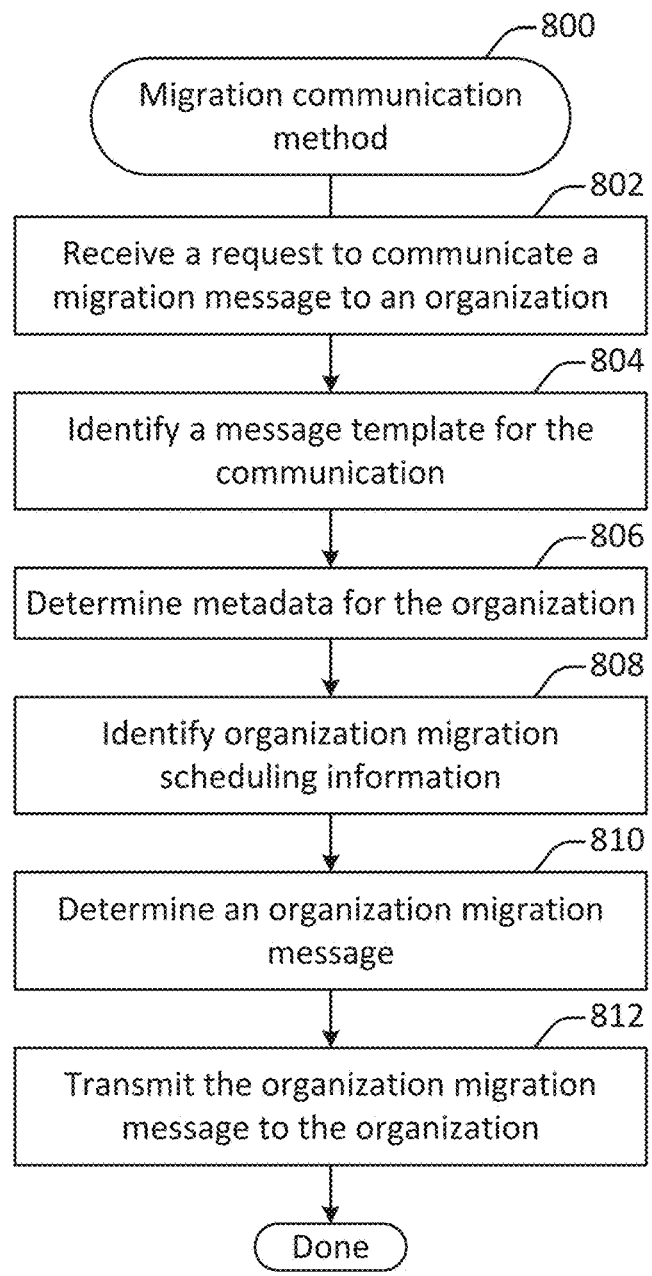
FIG. 8 illustrates an example of a method for migration communication, performed in accordance with one or more embodiments.

FIG. 8 illustrates an example of a method 800 for migration communication, performed in accordance with one or more embodiments. According to various embodiments, the method 800 may be employed to transmit information to an organization such as a scheduled, rescheduled, or completed migration of the organization from one computing pod to another. The method 800 may be implemented at a communications module, such as the communications module 324 shown in FIG. 3.

A request to communicate a migration message to an organization is received at 802. In some implementations, the request may be generated automatically as part of the migration scheduling and/or execution process. For example, the request may be generated when an organization is selected for migration. As another example, a request may be generated when an organization is scheduled for migration. As still another example, a request may be generated when an organization is successfully migrated from one computing pod to another computing pod.

A message template for the communication is identified at 804. According to various embodiments, the message template may be selected at least in part based on the type of request received at 802. For instance, different templates may be used for different stages of the migration process, different types of organizations, or other migration-relevant characteristics.

Metadata for the organization is determined at 806. According to various embodiments, the metadata for the organization may include any information suitable for use in communicating with the organization, and may be stored within the on-demand computing services environment. For example, organization metadata may identify the name and address of one or more individuals tasked with managing the organization within the on-demand computing services environment. As another example, organization metadata may include information suitable for completing the message template identified at 804, such as the organizations name, address, and other such data.

Organization migration scheduling information is identified at 808. In some implementations, the organization migration scheduling information may include any information relevant to the migration of the organization. For example, the information may identify when an organization is scheduled to be migrated. As another example, the information may identify a destination computing pod to which the organization is scheduled to be migrated. As still another example, the information may identify a window of time during which the migration of the organization may be rescheduled. As yet another example, the information may identify when and under what conditions a scheduled migration of the organization has been executed.

An organization migration message is determined at 810. In some implementations, the organization migration message may be determined by applying the organization migration scheduling information identified at 808 and/or the metadata for the organization determined at 806 to the message template identified at 804.

The organization migration message is transmitted to the organization at 812. According to various embodiments, the organization migration message may be transmitted via any suitable communication protocol, for instance via the communication interface 330 shown in FIG. 3. For example, the organization migration message may be sent via email, via a public messaging service, or via a private messaging service native to the on-demand computing services environment.

Figure 9:
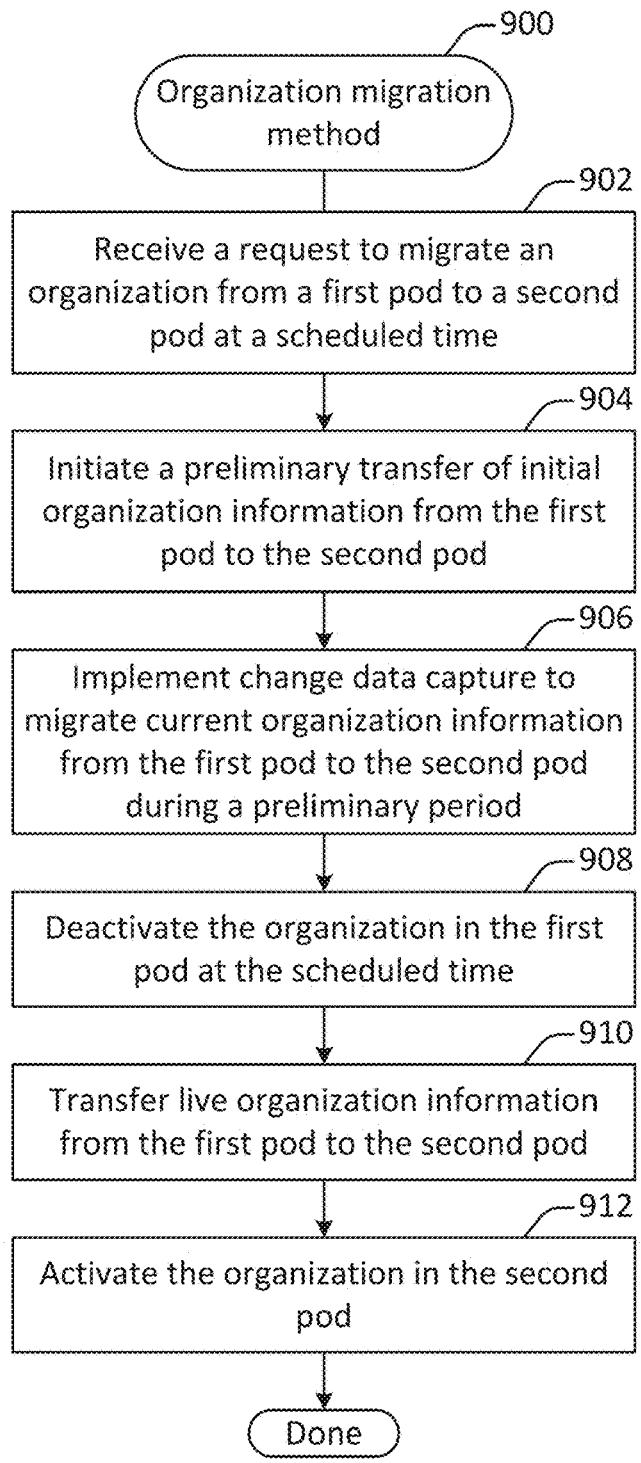
FIG. 9 illustrates an example of a method for migrating an organization, performed in accordance with one or more embodiments.

FIG. 9 illustrates an example of a method 900 for migrating an organization, performed in accordance with one or more embodiments. In some implementations, the method 900 may be performed by one or more components within a computing services environment. For instance, the method 900 may be performed by the workload execution module 318 shown in FIG. 3.

A request to migrate an organization from a first computing pod to a second computing pod at a scheduled time is received at 902. According to various embodiments, the request may be received from a scheduling module, such as the workload scheduler module 310 shown in FIG. 3.

A preliminary transfer of initial organization information from the first computing pod to the second computing pod is initiated at 904. In some implementations, the preliminary transfer of organization information may involve copying data associated with the organization. Such data may include one or more flat files, database tables, configuration settings, or other such information. The preliminary transfer of organization information may include capturing one or more snapshots of the organization's information on the first computing pod as of a designated point in time. Then, the one or more snapshots may be transmitted to the second computing pod. The second computing pod may unpack the snapshots, and copy the data into one or more storage systems at the second computing pod. For example, database information may be inserted into a database or copied into a file system on a storage device at the second computing pod.

Change data capture is initiated at 906 to migrate current organization information from the first computing pod to the second computing pod during a preliminary period. In some implementations, change data capture may be used to replicate changes made to the organization's data after the preliminary transfer of organization information. For instance, a snapshot may capture the organization's data as of a designated point in time. Then, changes made to the organization's data after the designated point in time may be captured in a change bus and exported to the second computing pod. In this way, changes made to the organization's data after the designated point in time may be reflected on both the first computing pod and the second computing pod.

The organization is deactivated at the scheduled in the first computing pod at 908. In some implementations, deactivating the organization may involve denying and/or queueing any requests associated with the organization.

Live organization information is transferred from the first computing pod to the second computing pod at 910. According to various embodiments, the live organization information may include any data associated with the organization that was not already transferred at operations 904 and 906. Such information may include, for instance, any remaining changed information that has not shipped via change data capture prior to deactivating the org. Alternately, or additionally, the transfer may include data in which change data capture is not available because, for instance, the data change volume is too high and/or change data capture too costly. As another example, derived data for various services such as search indexing may be re-created on the second computing pod. As still another example, a hash digest of the data on the second computing pod may be transferred to the first computing pod to validate that all data have transferred correctly.

The organization is activated in the second computing pod at 912. According to various embodiments, activating the organization at the second computing pod may involve operations related to resuming service. For example, one or more requests queued during the deactivation period may be executed at the second computing pod. As another example, newly received computing services requests may be executed at the second computing pod. As still another example, one or more records may be updated to direct computing requests associated with the organization to the second computing pod instead of the first computing pod.

In some implementations, an organization may be migrated from one computing pod to another computing pod in a short period of time, such as a few minutes. However, if larger data volumes are involved, such a migration may take a longer period of time, such as a few hours.

In some implementations, an organization transfer method may include one or more operations not shown in FIG. 9. For instance, as discussed with respect to FIG. 8, the system may automatically initiate communications with the organization, such as to inform the organization that the migration has been completed.

Figure 10:
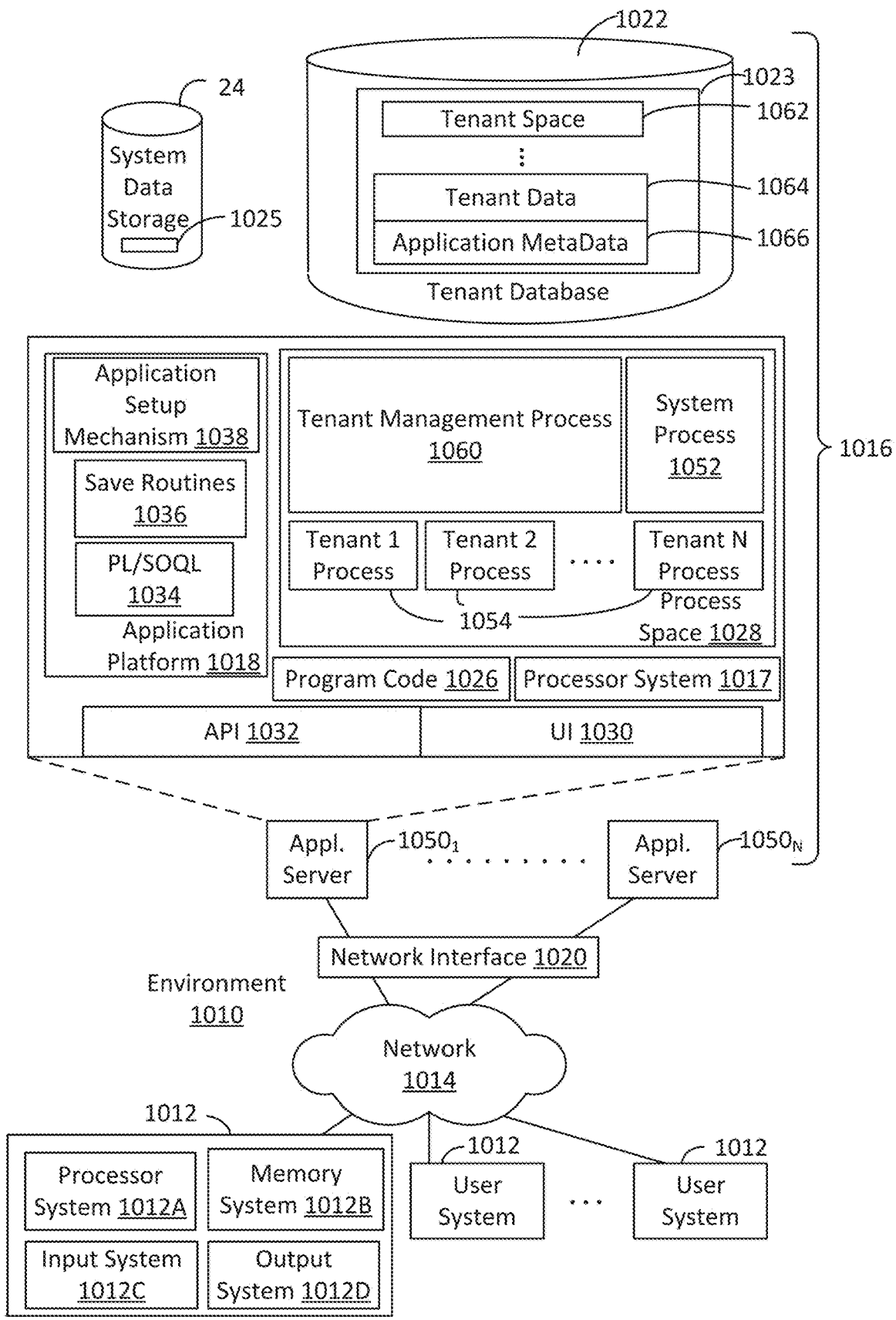
FIG. 10 shows a block diagram of an example of an environment that includes an on-demand database service configured in accordance with some implementations.

FIG. 10 shows a block diagram of an example of an environment 1010 that includes an on-demand database service configured in accordance with some implementations. Environment 1010 may include user systems 1012, network 1014, database system 1016, processor system 1017, application platform 1018, network interface 1020, tenant data storage 1022, tenant data 1023, system data storage 1024, system data 1025, program code 1026, process space 1028, User Interface (UI) 1030, Application Program Interface (API) 1032, PL/SOQL 1034, save routines 1036, application setup mechanism 1038, application servers 1050-1 through 1050-N, system process space 1052, tenant process spaces 1054, tenant management process space 1060, tenant storage space 1062, user storage 1064, and application metadata 1066. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1016, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 1016. Such applications may be developed by the database service provider or by users or third-party application developers accessing the service. Application platform 1018 includes an application setup mechanism 1038 that supports application developers' creation and management of applications, which may be saved as metadata into tenant data storage 1022 by save routines 1036 for execution by subscribers as one or more tenant process spaces 1054 managed by tenant management process 1060 for example. Invocations to such applications may be coded using PL/SOQL 1034 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1066 for a subscriber making such an invocation. Such system processes may also manage execution of application metadata 1066 as an application in a virtual machine.

In some implementations, each application server 1050 may handle requests for any user associated with any organization. A load balancing function (e.g., an F5 Big-IP load balancer) may distribute requests to the application servers 1050 based on an algorithm such as least-connections, round robin, observed response time, etc. Each application server 1050 may be configured to communicate with tenant data storage 1022 and the tenant data 1023 therein, and system data storage 1024 and the system data 1025 therein to serve requests of user systems 1012. The tenant data 1023 may be divided into individual tenant storage spaces 1062, which can be either a physical arrangement and/or a logical arrangement of data. Within each tenant storage space 1062, user storage 1064 and application metadata 1066 may be similarly allocated for each user. For example, a copy of a user's most recently used (MRU) items might be stored to user storage 1064. Similarly, a copy of MRU items for an entire tenant organization may be stored to tenant storage space 1062. A UI 1030 provides a user interface and an API 1032 provides an application programming interface to system 1016 resident processes to users and/or developers at user systems 1012.

System 1016 may implement a web-based organization analytics and migration system. For example, in some implementations, system 1016 may include application servers configured to implement and execute organization analytics and migration software applications. The application servers may be configured to provide related data, code, forms, web pages and other information to and from user systems 1012. Additionally, the application servers may be configured to store information to, and retrieve information from a database system. Such information may include related data, objects, and/or Webpage content. With a multi-tenant system, data for multiple tenants may be stored in the same physical database object in tenant data storage 1022, however, tenant data may be arranged in the storage medium(s) of tenant data storage 1022 so that data of one tenant is kept logically separate from that of other tenants. In such a scheme, one tenant may not access another tenant's data, unless such data is expressly shared.

Several elements in the system shown in FIG. 10 include conventional, well-known elements that are explained only briefly here. For example, user system 1012 may include processor system 1012A, memory system 1012B, input system 1012C, and output system 1012D. A user system 1012 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 1012 to access, process and view information, pages and applications available from system 1016 over network 1014. Network 1014 may be any network or combination of networks of devices that communicate with one another, such as any one or any combination of a LAN (local area network), WAN (wide area network), wireless network, or other appropriate configuration.

The users of user systems 1012 may differ in their respective capacities, and the capacity of a particular user system 1012 to access information may be determined at least in part by "permissions" of the particular user system 1012. As discussed herein, permissions generally govern access to computing resources such as data objects, components, and other entities of a computing system, such as an organization migration system, a social networking system, and/or a CRM database system. "Permission sets" generally refer to groups of permissions that may be assigned to users of such a computing environment. For instance, the assignments of users and permission sets may be stored in one or more databases of System 1016. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1016 may provide on-demand database service to user systems 1012 using an MTS arrangement. By way of example, one tenant organization may be a company that employs a sales force where each salesperson uses system 1016 to manage their sales process. Thus, a user in such an organization may maintain contact data, leads data, customer follow-up data, performance data, goals and progress data, etc., all applicable to that user's personal sales process (e.g., in tenant data storage 1022). In this arrangement, a user may manage his or her sales efforts and cycles from a variety of devices, since relevant data and applications to interact with (e.g., access, view, modify, report, transmit, calculate, etc.) such data may be maintained and accessed by any user system 1012 having network access.

When implemented in an MTS arrangement, system 1016 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1016 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1016 may also maintain system-level data usable by multiple tenants or other data. Such system-level data may include industry reports, news, postings, and the like that are sharable between tenant organizations.

In some implementations, user systems 1012 may be client systems communicating with application servers 1050 to request and update system-level and tenant-level data from system 1016. By way of example, user systems 1012 may send one or more queries requesting data of a database maintained in tenant data storage 1022 and/or system data storage 1024. An application server 1050 of system 1016 may automatically generate one or more SQL statements (e.g., one or more SQL queries) that are designed to access the requested data. System data storage 1024 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 11A:
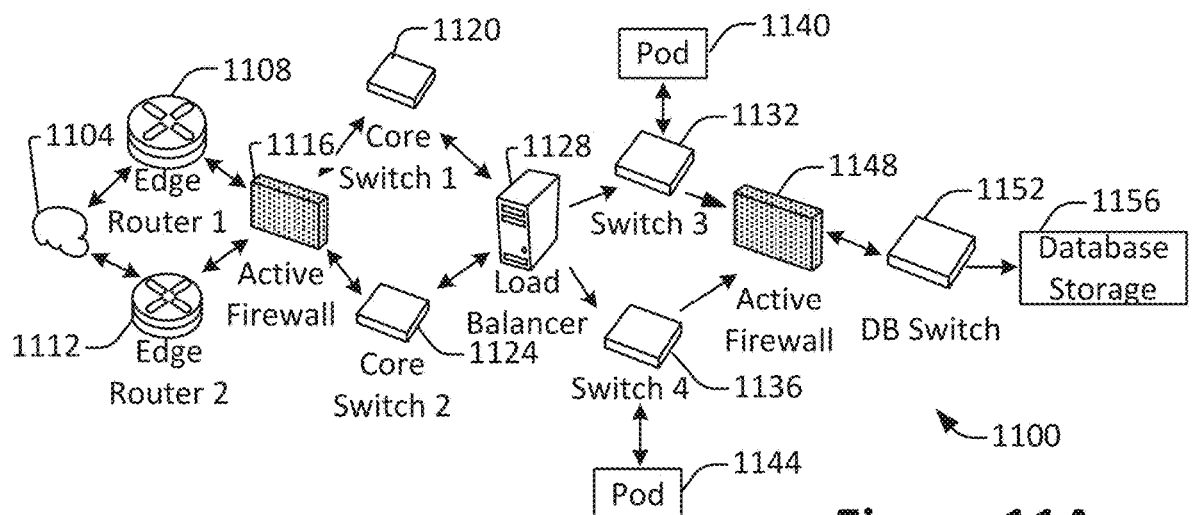
FIG. 11A shows a system diagram of an example of architectural components of an on-demand database service environment, configured in accordance with some implementations.

FIG. 11A shows a system diagram of an example of architectural components of an on-demand database service environment 1100, configured in accordance with some implementations. A client machine located in the cloud 1104 may communicate with the on-demand database service environment via one or more edge routers 1108 and 1112. A client machine may include any of the examples of user systems?12 described above. The edge routers 1108 and 1112 may communicate with one or more core switches 1120 and 1124 via firewall 1116. The core switches may communicate with a load balancer 1128, which may distribute server load over different pods, such as the pods 1140 and 1144 by communication via pod switches 1132 and 1136. The pods 1140 and 1144, which may each include one or more servers and/or other computing resources, may perform data processing and other operations used to provide on-demand services. Components of the environment may communicate with a database storage 1156 via a database firewall 1148 and a database switch 1152.

Accessing an on-demand database service environment may involve communications transmitted among a variety of different components. The environment 1100 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 11A and 11B.

The cloud 1104 refers to any suitable data network or combination of data networks, which may include the Internet. Client machines located in the cloud 1104 may communicate with the on-demand database service environment 1100 to access services provided by the on-demand database service environment 1100. By way of example, client machines may access the on-demand database service environment 1100 to retrieve, store, edit, and/or process computing environment usage metrics and analytics information.

In some implementations, the edge routers 1108 and 1112 route packets between the cloud 1104 and other components of the on-demand database service environment 1100. The edge routers 1108 and 1112 may employ the Border Gateway Protocol (BGP). The edge routers 1108 and 1112 may maintain a table of IP networks or 'prefixes', which designate network reachability among autonomous systems on the internet.

In one or more implementations, the firewall 1116 may protect the inner components of the environment 1100 from internet traffic. The firewall 1116 may block, permit, or deny access to the inner components of the on-demand database service environment 1100 based upon a set of rules and/or other criteria. The firewall 1116 may act as one or more of a packet filter, an application gateway, a stateful filter, a proxy server, or any other type of firewall.

In some implementations, the core switches 1120 and 1124 may be high-capacity switches that transfer packets within the environment 1100. The core switches 1120 and 1124 may be configured as network bridges that quickly route data between different components within the on-demand database service environment. The use of two or more core switches 1120 and 1124 may provide redundancy and/or reduced latency.

In some implementations, communication between the pods 1140 and 1144 may be conducted via the pod switches 1132 and 1136. The pod switches 1132 and 1136 may facilitate communication between the pods 1140 and 1144 and client machines, for example via core switches 1120 and 1124. Also or alternatively, the pod switches 1132 and 1136 may facilitate communication between the pods 1140 and 1144 and the database storage 1156. The load balancer 1128 may distribute workload between the pods, which may assist in improving the use of resources, increasing throughput, reducing response times, and/or reducing overhead. The load balancer 1128 may include multilayer switches to analyze and forward traffic.

In some implementations, access to the database storage 1156 may be guarded by a database firewall 1148, which may act as a computer application firewall operating at the database application layer of a protocol stack. The database firewall 1148 may protect the database storage 1156 from application attacks such as structure query language (SQL) injection, database rootkits, and unauthorized information disclosure. The database firewall 1148 may include a host using one or more forms of reverse proxy services to proxy traffic before passing it to a gateway router and/or may inspect the contents of database traffic and block certain content or database requests. The database firewall 1148 may work on the SQL application level atop the TCP/IP stack, managing applications' connection to the database or SQL management interfaces as well as intercepting and enforcing packets traveling to or from a database network or application interface.

In some implementations, the database storage 1156 may be an on-demand database system shared by many different organizations. The on-demand database service may employ a single-tenant approach, a multi-tenant approach, a virtualized approach, or any other type of database approach. Communication with the database storage 1156 may be conducted via the database switch 1152. The database storage 1156 may include various software components for handling database queries. Accordingly, the database switch 1152 may direct database queries transmitted by other components of the environment (e.g., the pods 1140 and 1144) to the correct components within the database storage 1156.

Figure 11B:
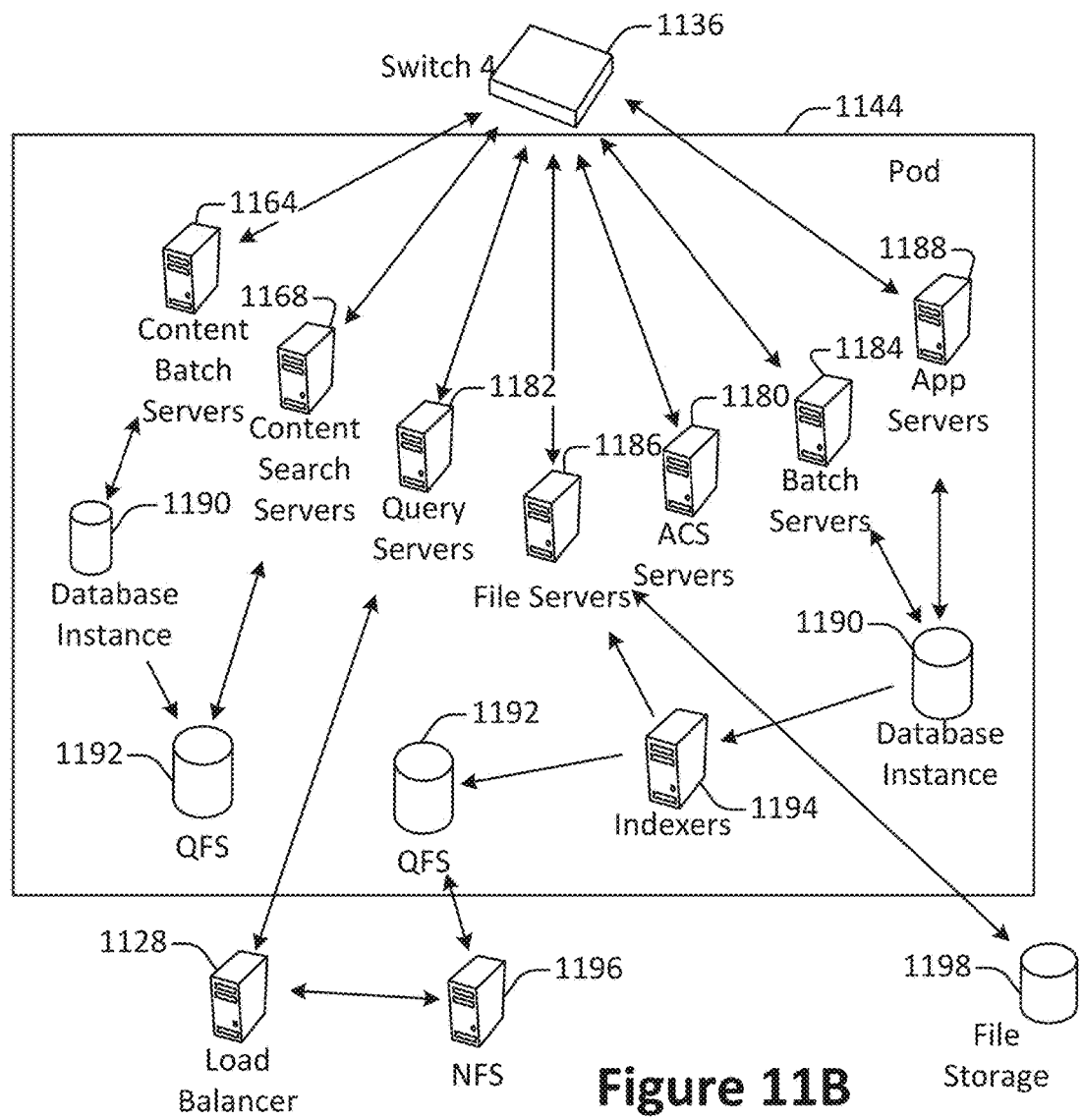
FIG. 11B shows a system diagram further illustrating an example of architectural components of an on-demand database service environment, in accordance with some implementations.

FIG. 11B shows a system diagram further illustrating an example of architectural components of an on-demand database service environment, in accordance with some implementations. The pod 1144 may be used to render services to user(s) of the on-demand database service environment 1100. The pod 1144 may include one or more content batch servers 1164, content search servers 1168, query servers 1182, file servers 1186, access control system (ACS) servers 1180, batch servers 1184, and app servers 1188. Also, the pod 1144 may include database instances 1190, quick file systems (QFS) 1192, and indexers 1194. Some or all communication between the servers in the pod 1144 may be transmitted via the switch 1136.

In some implementations, the app servers 1188 may include a framework dedicated to the execution of procedures (e.g., programs, routines, scripts) for supporting the construction of applications provided by the on-demand database service environment 1100 via the pod 1144. One or more instances of the app server 1188 may be configured to execute all or a portion of the operations of the services described herein.

In some implementations, as discussed above, the pod 1144 may include one or more database instances 1190. A database instance 1190 may be configured as an MTS in which different organizations share access to the same database, using the techniques described above. Database information may be transmitted to the indexer 1194, which may provide an index of information available in the database 1190 to file servers 1186. The QFS 1192 or other suitable filesystem may serve as a rapid-access file system for storing and accessing information available within the pod 1144. The QFS 1192 may support volume management capabilities, allowing many disks to be grouped together into a file system. The QFS 1192 may communicate with the database instances 1190, content search servers 1168 and/or indexers 1194 to identify, retrieve, move, and/or update data stored in the network file systems (NFS) 1196 and/or other storage systems.

In some implementations, one or more query servers 1182 may communicate with the NFS 1196 to retrieve and/or update information stored outside of the pod 1144. The NFS 1196 may allow servers located in the pod 1144 to access information over a network in a manner similar to how local storage is accessed. Queries from the query servers 1122 may be transmitted to the NFS 1196 via the load balancer 1128, which may distribute resource requests over various resources available in the on-demand database service environment 1100. The NFS 1196 may also communicate with the QFS 1192 to update the information stored on the NFS 1196 and/or to provide information to the QFS 1192 for use by servers located within the pod 1144.

In some implementations, the content batch servers 1164 may handle requests internal to the pod 1144. These requests may be long-running and/or not tied to a particular customer, such as requests related to log mining, cleanup work, and maintenance tasks. The content search servers 1168 may provide query and indexer functions such as functions allowing users to search through content stored in the on-demand database service environment 1100. The file servers 1186 may manage requests for information stored in the file storage 1198, which may store information such as documents, images, basic large objects (BLOBs), etc. The query servers 1182 may be used to retrieve information from one or more file systems. For example, the query system 1182 may receive requests for information from the app servers 1188 and then transmit information queries to the NFS 1196 located outside the pod 1144. The ACS servers 1180 may control access to data, hardware resources, or software resources called upon to render services provided by the pod 1144. The batch servers 1184 may process batch jobs, which are used to run tasks at specified times. Thus, the batch servers 1184 may transmit instructions to other servers, such as the app servers 1188, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 12:
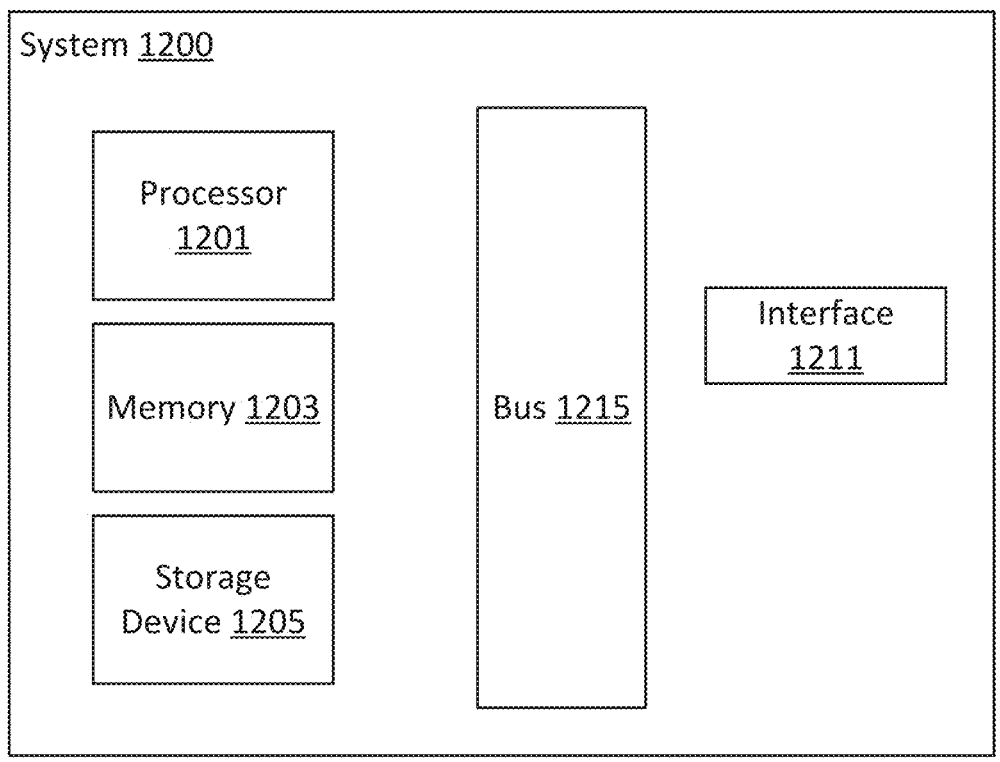
FIG. 12 illustrates one example of a computing device, configured in accordance with one or more embodiments.

FIG. 12 illustrates one example of a computing device. According to various embodiments, a system 1200 suitable for implementing embodiments described herein includes a processor 1201, a memory module 1203, a storage device 1205, an interface 1211, and a bus 1215 (e.g., a PCI bus or other interconnection fabric.) System 1200 may operate as variety of devices such as an application server, a database server, or any other device or service described herein. Although a particular configuration is described, a variety of alternative configurations are possible. The processor 1201 may perform operations such as those described herein. Instructions for performing such operations may be embodied in the memory 1203, on one or more non-transitory computer readable media, or on some other storage device. Various specially configured devices can also be used in place of or in addition to the processor 1201. The interface 1211 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining via a processor a respective resource utilization level for each of a plurality of organizations within a computing pod, the computing pod being located within an on-demand computing services organization configured to provide computing services to a plurality of entities including the organizations, the computing pod including one or more computing hardware components configured to provide the computing services to the organizations;
   determining via the processor a respective data size for each of the plurality of organizations, the data size indicating an amount of data stored in association with the respective organization;
   selecting a designated one of the organizations for migration away from the computing pod based on the resource utilization levels and the data sizes, the designated organization having a respective resource utilization level that is high in relation to its respective data size;
   transmitting via a communication interface an organization migration message identifying the designated organization for migration away from the computing pod; and
   migrating the designated organization from the computing pod to a destination computing pod, wherein the migration comprises transferring data associated with the designated organization from the computing pod to the destination computing pod, disabling access to the designated organization at the computing pod, and activating the designated organization at the destination computing pod.

2. The method recited in claim 1, determining a migration tax for the computing pod, the migration tax measuring a computing cost associated with migrating one or more organizations away from the computing pod.

3. The method recited in claim 2, wherein the designated organization is selected at least in part based on the migration tax.

4. The method recited in claim 3, wherein the designated organization is selected when it is determined that the migration tax is below a designated threshold.

5. The method recited in claim 1, the method further comprising:
   parsing one or more resource utilization logs to identify resource utilization for the computing pod.

6. The method recited in claim 5, wherein resource utilization is identified for each organization within the computing pod.

7. The method recited in claim 1, wherein the designated organization is associated with a resource utilization level for a designated resource that exceeds a designated threshold.

8. The method recited in claim 1, wherein the designated resource is selected from the group consisting of: central processing unit (CPU) usage, data input/output, memory, and application procedure interface (API) calls.

9. The method recited in claim 1, determining a migration risk associated with the designated organization.

10. The method recited in claim 9, wherein the designated organization is selected at least in part based on the migration risk.

11. The method recited in claim 1, wherein data associated with the plurality of organizations is stored in a multitenant database.

12. A computing device within an on-demand computing services environment, the computing device comprising:
   a processor configured to:
   determine a respective resource utilization level for each of a plurality of organizations within a computing pod, the computing pod being located within the on-demand computing services organization configured to provide computing services to a plurality of entities including the organizations, the computing pod including one or more computing hardware components configured to provide the computing services to the organizations,
   determine a respective data size for each of the plurality of organizations, the data size indicating an amount of data stored in association with the respective organization,
   select a designated one of the organizations for migration away from the computing pod based on the resource utilization levels and the data sizes, the designated organization having a respective resource utilization level that is high in relation to its respective data size;
   a communication interface configured to transmit an organization migration message identifying the designated organization for migration away from the computing pod; and
   a migration engine configured migrate the designated organization from the computing pod to a destination computing pod, wherein the migration comprises transferring data associated with the designated organization from the computing pod to the destination computing pod, disabling access to the designated organization at the computing pod, and activating the designated organization at the destination computing pod.

13. The computing device recited in claim 12, wherein the processor is further configured to determine a migration tax for the computing pod, the migration tax measuring a computing cost associated with migrating one or more organizations away from the computing pod.

14. The computing device recited in claim 13, wherein the designated organization is selected at least in part based on the migration tax.

15. The computing device recited in claim 14, wherein the designated organization is selected when it is determined that the migration tax is below a designated threshold.

16. The method recited in claim 12, parsing one or more resource utilization logs to identify resource utilization for the computing pod.

17. The method recited in claim 16, wherein resource utilization is identified for each organization.

18. One or more non-transitory computer readable media having instructions stored thereon for performing a method, the method comprising:

determining via a processor a respective resource utilization level for each of a plurality of organizations within a computing pod, the computing pod being located within an on-demand computing services organization configured to provide computing services to a plurality of entities including the organizations, the computing pod including one or more computing hardware components configured to provide the computing services to the organizations;

determining via the processor a respective data size for each of the plurality of organizations, the data size indicating an amount of data stored in association with the respective organization;

selecting a designated one of the organizations for migration away from the computing pod based on the resource utilization levels and the data sizes, the designated organization having a respective resource utilization level that is high in relation to its respective data size;

transmitting via a communication interface an organization migration message identifying the designated organization for migration away from the computing pod; and migrating the designated organization from the computing pod to a destination computing pod, wherein the migration comprises transferring data associated with the designated organization from the computing pod to the destination computing pod, disabling access to the designated organization at the computing pod, and activating the designated organization at the destination computing pod.

19. The one or more non-transitory computer readable media recited in claim 18, the method further comprising:
   determining a migration tax for the computing pod, the migration tax measuring a computing cost associated with migrating one or more organizations away from the computing pod.

20. The one or more non-transitory computer readable media recited in claim 19, wherein the designated organization is selected at least in part based on the migration tax.

* * * * *